A. W. REYNOLDS.
TRACTOR PLOW.
APPLICATION FILED DEC. 5, 1918.

1,301,744.

Patented Apr. 22, 1919.
3 SHEETS—SHEET 1.

Inventor
Arthur W. Reynolds
By Chamberlain & Newman
Attorneys

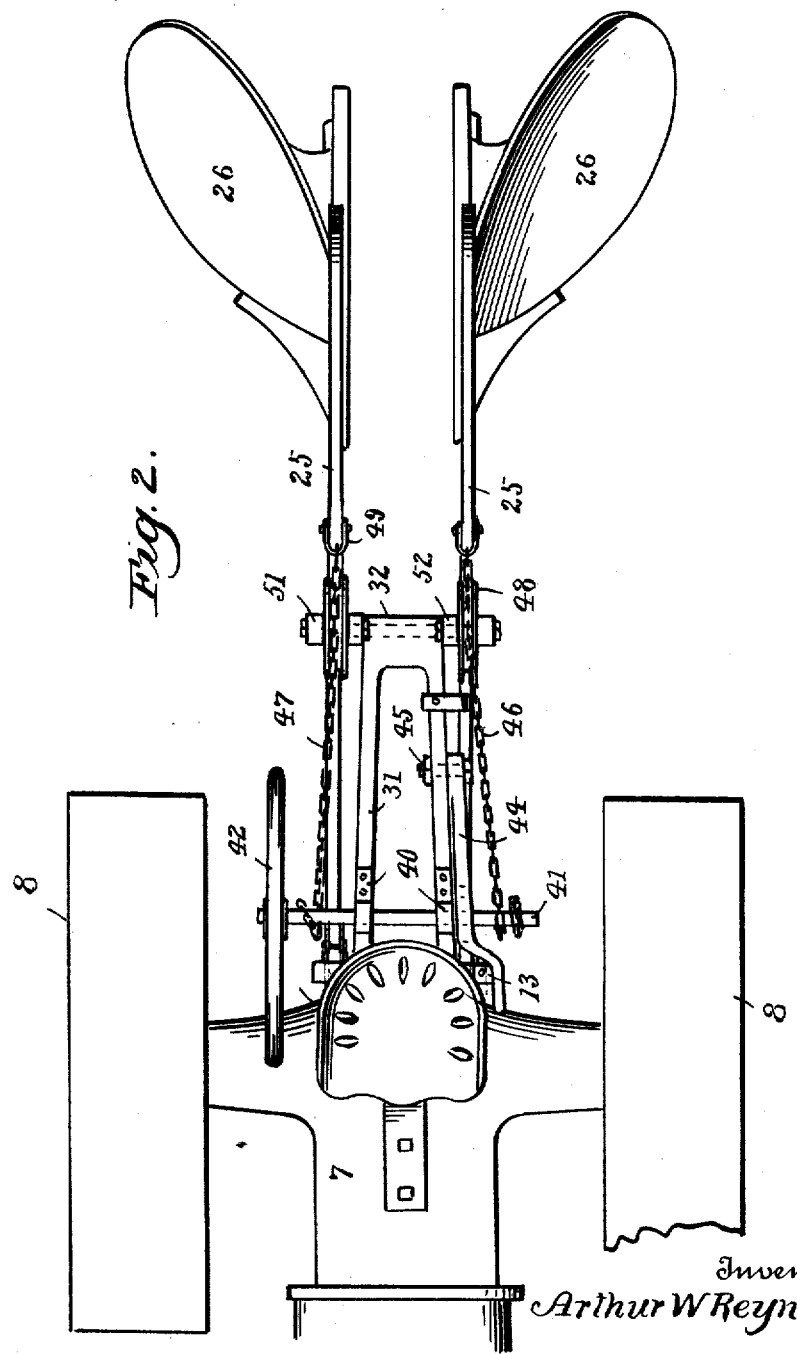

A. W. REYNOLDS.
TRACTOR PLOW.
APPLICATION FILED DEC. 5, 1918.
1,301,744.
Patented Apr. 22, 1919.
3 SHEETS—SHEET 3.
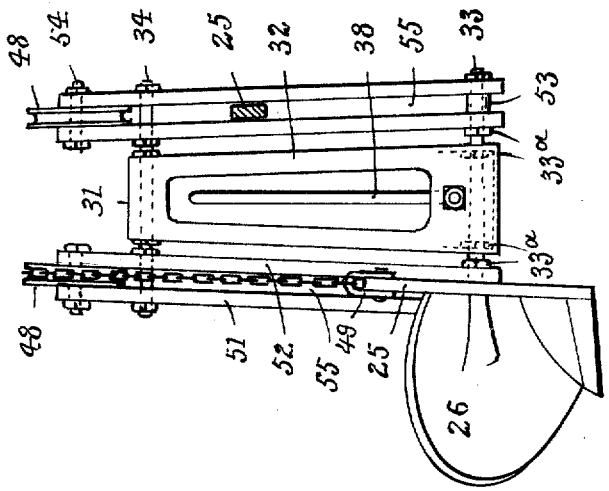
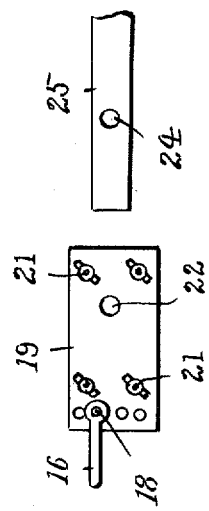
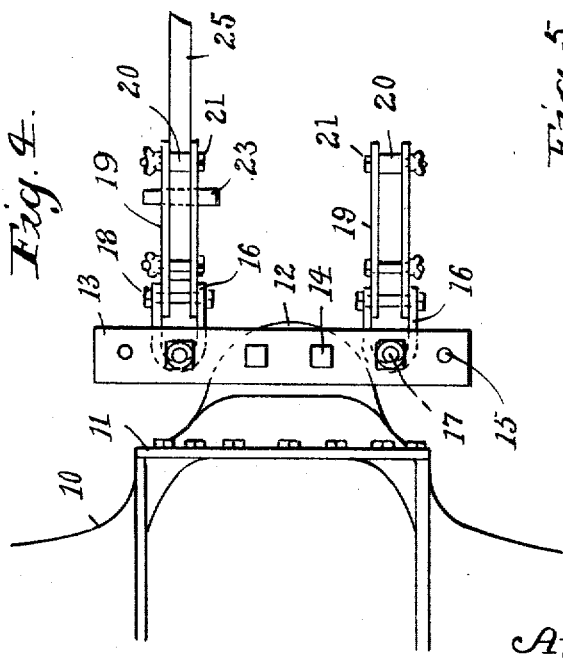
Inventor
Arthur W. Reynolds
By Chamberlain & Newman
Attorneys

UNITED STATES PATENT OFFICE.

ARTHUR W. REYNOLDS, OF NEWTOWN, CONNECTICUT, ASSIGNOR OF ONE-HALF TO EDWARD BENEDICT, OF NEWTOWN, CONNECTICUT.

TRACTOR-PLOW.

1,301,744.   Specification of Letters Patent.   Patented Apr. 22, 1919.

Application filed December 5, 1918. Serial No. 265,340.

*To all whom it may concern:*

Be it known that I, ARTHUR W. REYNOLDS, a citizen of the United States and resident of Newtown, in the county of Fairfield and State of Connecticut, have invented certain new and useful Improvements in Tractor-Plows, of which the following is a specification.

This invention relates to new and useful improvements in plows and particularly to tractor plows, that is, plows which are adapted to be attached to and drawn by tractors.

It is the object of the invention to provide a new form of plow which is adapted to be directly and quickly connected to the rear portion of several well known types of tractors, and particularly that commercially known as the Fordson, and which when so attached may be conveniently operated by one man, the driver of the tractor, while mounted upon the seat of the tractor and with comparatively little extra labor, said plow being particularly suitable for plowing comparatively small fields where considerable turning around is necessary and especially stony and sloping land.

The invention further includes a pair of plows, one of which is adapted for throwing the furrow to the right and the other to the left, similar in operation to a "two way" sulky plow, so-called, thereby permitting all furrows to be turned in one direction leaving no dead furrows, and includes means for raising, and lowering, and supporting one or both of the plows above the surface of the ground, so that one can be used at a time and whereby both may be raised while turning the machine, backing up, or in moving it from one field to another. The plow further includes means for supporting and tilting the plows so as to insure the plow points better entering the ground and remaining therein. The construction is also especially adapted for the use of regular commercial types of plows, including their beams, such as are commonly employed in sulky plows. Further, an important feature of the construction of my plows is the means by which the beam ends may be quickly attached to the draw bar and the simple breakable means whereby the plows are detached should the plow point strike a solid object such as a large root or heavy stone.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which Figure 1 shows a sectional elevation of my improved form of tractor plow illustrated as attached to the rear end of a Fordson tractor.

Fig. 2 is a plan view of the same, the cutting disks and adjustable depth wheel being omitted.

Fig. 3 is a rear sectional elevation of the plow, showing the adjustable inclined guideways for the plow beams.

Fig. 4 is an enlarged detail view of the detachable draw bar with the clevises and shives to which the forward ends of the plow beams are attached, and Fig. 5 shows a detail side view of the clevis, shive and forward end of the plow beam.

Figure 1:
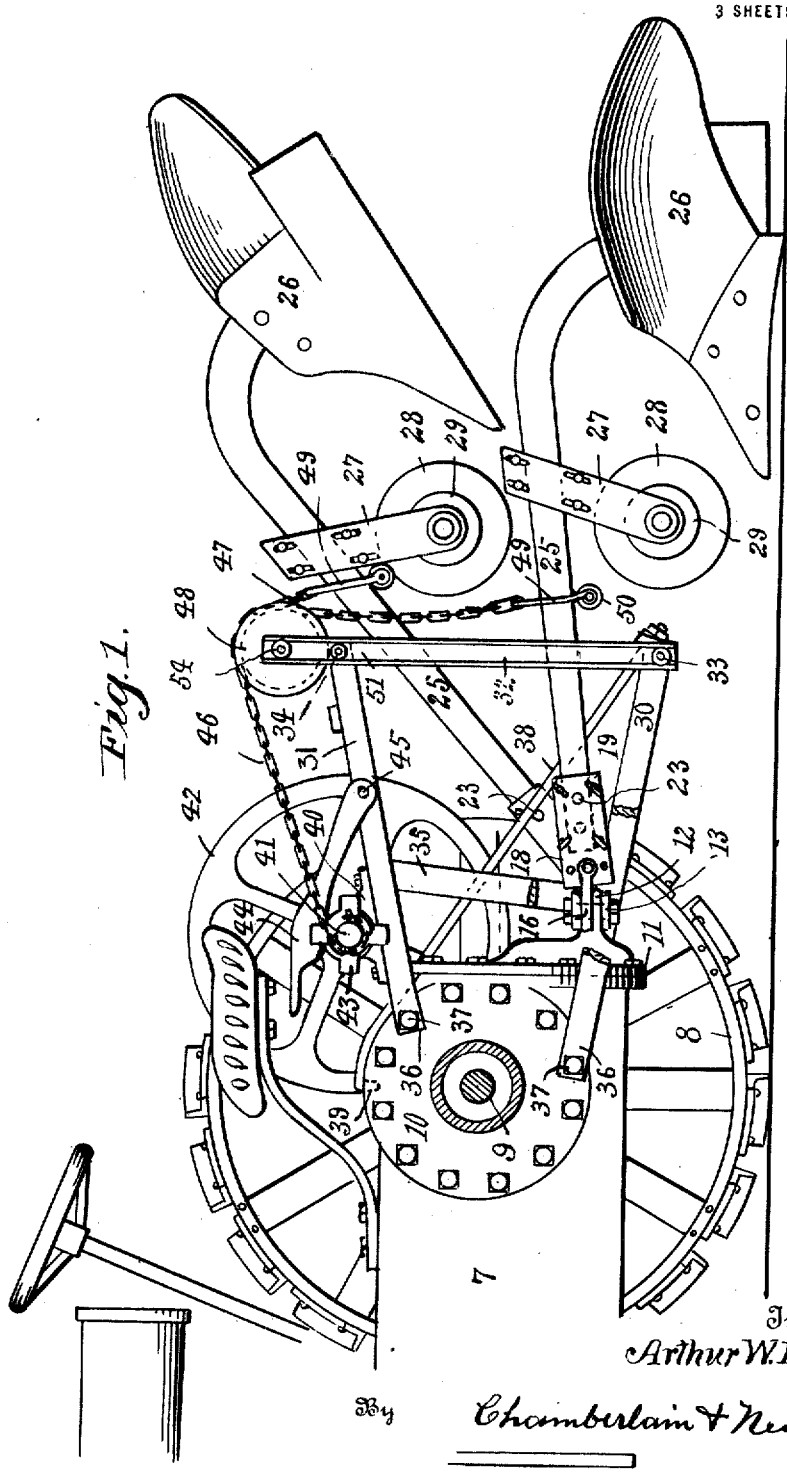

Referring in detail to the characters of reference marked upon the drawings, 7 represents a part of the main body of a tractor, 8 the traction wheels, 9 the axle, 10 the transmission case, which is positioned around the central portion of the rear axle and also forms a part of the main frame. 11 represents a closure plate for the transmission case and as will be seen includes a rearwardly extended flange 12 having holes therein for the attachment of plows, vehicles, etc. So much of the construction already described represents a commercial type of tractor and forms no part of the invention. I have, however, adapted my plow for attachment to this as well as other styles of tractors so as to require little or no change in construction.

13 represents a draw bar that is made in the form of two plates which are attached to the flange 12 by screw bolts 14. In the two opposite end portions of this draw bar are formed suitable holes 15 to which the clevises and shives for supporting the forward end of the two plow beams are attached. There are two sets of these clevises and shives, one for each plow beam, and they are alike in construction. Therefore I will use the same reference characters to designate the same parts in the two sets. 16 indicates these clevises, the loop portions of which lie between the two members of the draw bar and are detachably secured therein by pin bolts 17, which in turn are connected by bolts 18 to the shives 19. These shives are formed of two plates 19 which are spaced apart by sleeves 20 and secured by bolts 21 passing therethrough to secure the parts in fixed positions, and provided with wing nuts to permit of easy adjustment. A hole 22 is formed through the central portion of the two plates of each shive to receive a pin 23 that also passes through holes 24 in the forward end portion of the plow beam 25. These pins are made of wood and are thereby limited in the amount of their endurance and in fact are adapted to be broken to release the plow beam and plow should the same strike a solid object. This forward end of the plow beam as will be seen readily slides between the upper and lower bolts 21 thereby insuring the alinement of the hole 24 with the holes 22 so as to readily receive the pin and to insure quick connection and attachment of the parts.

The remaining portion of the plow beam as well as its plow 26 may be of the usual or any preferred construction. I use upon the beams of these plows a holder 27 on which there is mounted a sod cutting disk 28 to cut and turn the edge under and that alines with the vertical cutting edge of the plow shear, and also a wheel 29 that follows the surface of the ground and regulates the depth to which the plow may be run in the ground. It will also be noted that I have provided means for the vertical adjustment of these holders 27 whereby the roll may be set at various heights to regulate the depth of the furrow.

In addition to the connection of the plow beams to the draw bars 13 I also guide and support them by a framework which includes a lower portion 30 and an upper portion 31 and a vertical member 32. The said lower and vertical members are bolted together at 33 and the upper member is bolted to the upper portion of the vertical member at 34. A pair of braces 35 are also preferably positioned between the said upper and lower portions in the manner indicated. The forward portions of both the upper and lower members are forked so as to straddle the transmission case and the end portions 36 upon their respective sides are provided with bolt holes whereby the said portions of the frame may be secured to the transmission case by means of the screw bolts 37 which are also employed for closing the transmission case. It will thus be seen that the frame portion of the plow as well as the draw bar, to which the plow beams are attached, are all adapted to be connected to fixed points of this form of tractor without any special drilling or cutting. In addition to this means of supporting the frame I provide a brace rod 38, the upper end portion of which is bent down at a right angle to engage a casting hole 39 in the top of the transmission case while the lower end portion of the rod is attached to the lower portion of the vertical member 32 of the frame.

I provide a pair of bearings 40 upon the top member 31 of the frame to support a cross shaft 41 upon which the hand wheel 42 is mounted. This shaft is further provided with a toothed disk 43 which is adapted to be engaged by a pawl 44 that is pivoted at 45 to the frame 31 so as to hold the shaft against turning and at the same time to permit of the disengagement of the shaft when it is desired to turn the same. The forward end portions of chains 46 and 47 are attached to the end portions of this shaft, one of said chains being adapted to wind upon the shaft from the upper side, so that one will be wound up when the other is run out. These chains extend rearward and run over grooved pulleys 48 and their end portions are attached to yokes 49 carrying roller bearings 50 upon their underside to engage the underside of the plow beams. Said yokes and rollers serve to encircle and slidably support the beams when the plows are raised, and are enough larger than the beams to permit them to pull out therethrough should the pin 23 break or be taken out.

Upon the two sides of the vertical member 32 of the frame I provide a pair of vertically disposed strips 51 and 52, the lower end portions of which are spaced apart by sleeves 53 and the upper end portion by the before mentioned grooved wheels 48. Bolts 54 serve to connect the upper ends of the strips 51 and 52 and also act as bearings for the wheels 48, while the before mentioned bolt 33 connects the lower ends. These guide strips thus form slots 55 in which the plow beams are free to move vertically in going over obstructions and longitudinally when disconnected. Said strips and guide ways, as will be noticed, are arranged upon a slight incline so that the plow beams are tilted slightly, the upper edge being deflected in, and the lower edge deflected out. This is for the purpose of slightly turning the plows in, to insure the plow points entering the ground quickly and properly. I have further provided means for adjusting the lower end portion of these strips inward or outward so as to increase or decrease the incline to better regulate the set for the plows according to the particular character of the land to be plowed. This adjusting means consists, as will be apparent, of nuts 33ª mounted upon the threaded end portion of the bolt 22 that passes through the lower end of the strips. From the foregoing it will be seen that if the hand wheel and its shaft is adjusted to the position indicated in Fig. 1 the chain 46 will be wound upon the far end of the shaft in a way to raise the plow while the chain 47 upon the near end is run off and allowed to become slack so as to permit the plow to freely enter and remain in the ground until such times as the hand wheel and shaft are turned, in a way to wind up the chain 47 and run out the chain 46. The pawl 44 obviously serves to support the shaft and its connected plows in any of the adjusted positions and may easily be disconnected when it is desired to change the relative positions of the two plows. If the hand wheel and shaft are adjusted to an intermediate position the plows balance and will be elevated sufficiently to keep them out of the ground for backing up and turning around, going on the road, etc.

Having thus described my invention, what I claim and desire to secure by Letters Patent is,

1. In a plow of the class described, the combination of a frame including guide slots, a draw bar also adapted to be attached to the tractor, plow beams movably mounted in the slots of the frame and connected to the end portion of the draw bar, and means connecting the two plow beams for raising and lowering the same.

2. In a plow of the class described, the combination of a frame including a pair of guide slots, a draw bar, a pair of plows, the beams of which are guided in said slots, means for connecting the plow beams to the draw bar when extending through the slots of the frame, and means connected with the plow for alternately raising and lowering the same.

3. In a plow of the class described, the combination of a frame and including a pair of guide slots, a draw bar also adapted to be attached to the tractor, a pair of plows, means mounted upon the draw bar for the detachable connection of the plow beams when extending through the slots of the frame, a shaft and operating means mounted upon the frame and having connections for supporting and raising and lowering the plow beams and plows.

4. In a plow of the class described, the combination of a frame and including a pair of guide slots, a draw bar also adapted to be attached to the tractor, a pair of plows, a sleeve including a pocket mounted upon each end portion of the draw bar for the reception of the plow beams when extending through the slots of the frame, and breakable pins for fastening the draw bars in the pockets of the shives.

5. In a plow of the class described, the combination of a frame and including a pair of guide slots, a draw bar also adapted to be attached to the tractor, a shive including a pocket mounted upon each end portion of the draw bar, a pair of plows the beams of which are extended through the slots of the frame and connected in the pockets of the shives, and means connected with the plow beams for alternately raising and lowering the same.

6. In a plow of the class described, the combination of a frame and including a pair of inclined guide slots, a draw bar also adapted to be attached to the tractor, plows connected to the draw bars, a shive including a pocket mounted upon each end portion of the draw bar for the reception of the plow beams when mounted in the slots of the frame, and means connected with the plow beams for alternately raising and lowering the same in the inclined slots.

7. In a plow of the class described, the combination of a frame and including a pair of inclined guide slots, a draw bar also adapted to be attached to the tractor, a pair of plows guided by the slots, a shive including a pocket mounted upon each end portion of the draw bar for the reception of the plow beams, detachable means for connecting the draw bars to the shives, a shaft and means for operating the same, two chains, one end of each of which is connected to a plow beam and the other end with opposite sides of the shaft for alternately raising and lowering the same.

8. In a plow of the class described, the combination of a frame and including a pair of guide slots, a draw bar also adapted to be attached to the tractor, a pair of plows the beams of which extend through the slots, attaching means pivotally connected with the draw bar, in alinement with the slots, breakable pins connecting the draw bars with the attaching means, and means connected with the plow beams for alternately raising and lowering the same.

9. In a plow of the class described, the combination of a frame and including a pair of guide slots, a draw bar also adapted to be attached to the tractor, a pair of plows hingedly connected to the draw bar and mounted in the slots of the frame, operating means mounted upon the frame in close proximity to the tractor seat, and connections therefrom for raising and lowering the plows.

10. In a plow of the class described, the combination of a draw bar, a pair of plows hitched to the draw bar, guide slots through which the plow beams are guided, means for adjusting the guide slots to different angular positions, and connections for raising and lowering the plows.

Signed at Bridgeport, in the county of Fairfield and State of Connecticut, this 1st day of December A. D., 1918.

ARTHUR W. REYNOLDS.

Witnesses:
C. M. NEWMAN,
LILLIAN M. ALLING.

Copies of this patent may be obtained for five cents each, by addressing the "Commissioner of Patents, Washington, D. C."